(12) United States Patent
Keskar

(10) Patent No.: US 11,429,583 B2
(45) Date of Patent: Aug. 30, 2022

(54) SYSTEM AND METHOD OF CREATING DATABASE ARRANGEMENT

(71) Applicant: Innoplexus AG, Eschborn (DE)

(72) Inventor: Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 202 days.

(21) Appl. No.: 16/367,554

(22) Filed: Mar. 28, 2019

(65) Prior Publication Data

US 2020/0097453 A1 Mar. 26, 2020

Related U.S. Application Data

(60) Provisional application No. 62/664,407, filed on Apr. 30, 2018.

(51) Int. Cl.
*G06F 16/22* (2019.01)
*G06F 21/62* (2013.01)

(52) U.S. Cl.
CPC ...... *G06F 16/2272* (2019.01); *G06F 21/6245* (2013.01)

(58) Field of Classification Search
None
See application file for complete search history.

(56) References Cited

U.S. PATENT DOCUMENTS

| 6,076,088 A * | 6/2000 | Paik | G06F 16/367 |
| 2005/0055327 A1* | 3/2005 | Agrawal | G06F 16/335 |
| 2006/0053173 A1* | 3/2006 | Gardner | G06F 16/367 |
| 2007/0239705 A1* | 10/2007 | Hunt | G06F 21/6245 |
| 2014/0047234 A1* | 2/2014 | Davis | G06F 21/6209 713/160 |
| 2017/0270184 A1* | 9/2017 | Huang | G06F 16/2228 |

FOREIGN PATENT DOCUMENTS

EP 2734953 B1 * 5/2018 ......... H04L 63/0407

* cited by examiner

*Primary Examiner* — William B Partridge
*Assistant Examiner* — Erich Alexander Fischer
(74) *Attorney, Agent, or Firm* — Ziegler IP Law Group, LLC

(57) ABSTRACT

A system, that when operated, creates a database arrangement in a structured manner, wherein the database arrangement stores documents from at least one source, the system including a server arrangement and the database arrangement wherein the server arrangement: retrieves the documents from the at least one source; pre-processes the documents from the at least one source, wherein a given document is pre-processed based on source of the given document; associates a document identifier with each of the documents; extract keywords from the documents; store the documents in the database arrangement corresponding to the document identifiers associated therewith; and create an index for the database arrangement, wherein the index includes document identifier listed corresponding to the extracted keywords.

6 Claims, 3 Drawing Sheets

| KEYWORD | DOCUMENT IDENTIFIER |
|---|---|
| PHASE | RA-2007A22 |
| TUMOUR | HJ-2105AC2 |
| CLUSTER | BM-5076E76 |
| CYBER SECURITY | SM-8065AF0 |

SYSTEM AND METHOD OF CREATING DATABASE ARRANGEMENT

CROSS-REFERENCE TO RELATED APPLICATIONS

This is a non-provisional patent application based upon a provisional patent application no. U.S. 62/664,407 as filed on Apr. 30, 2018, and claims priority under 35 U.S.C. 199(e).

TECHNICAL FIELD

The present disclosure relates generally to data processing and database management; and more specifically, to systems and methods of creating a database arrangement.

BACKGROUND

Generally, a person tends to perform a plurality of tasks in his/her day to day life. The person tends to research regarding the plurality of tasks using data available in form of articles, books, journals, newspapers and the like. As the information technology has developed the data used in researching about the plurality of tasks has become available in digital form such as on a website, an e-book, a word document and the like. Such digital data is retrieved by the person for research related with the plurality of tasks. Presently, many existing searching techniques are used for retrieving data relevant to a user-input.

The existing searching techniques retrieve digital documents by way of identification of common keywords, concepts, phrases in the user-input and digital documents. At first, the existing techniques identify one or more keywords, concepts in the user-input. Subsequently, the existing searching techniques access digital documents in order to identify one or more keywords, concepts identical to the one or more keywords, concepts identified in the user-input. An output is provided, when a match for the one or more keywords, concepts in the user-input is found in the digital document.

However, the existing searching techniques provide the output by way of accessing the digital documents. In addition, the existing searching techniques analyses content of the digital document for proving the output. Notably, the existing searching techniques can analyze only the digital documents that are accessible thereto. Furthermore, the digital documents provided as the output by the existing searching techniques needs to be re-analyzed in order to determine context thereof. Notably, the need to re-analyze the digital document provided as the output increases time and manual effort required for retrieval of relevant digital documents. Moreover, increase in time and manual effort increases cost of retrieving the relevant digital documents. In addition, relevance of the digital documents that are not accessible to the existing searching techniques cannot be determined. In an instance, a person wanting to determine relevance of a confidential and sensitive digital data, that is inaccessible to the existing techniques, is unable to do so using the existing searching techniques. In another instance, a person having a confidential and sensitive digital data might be forced to share the confidential and sensitive digital data in order to find authentic buyers for the same. Notably, sharing of the confidential and sensitive digital data may lead to misuse of such data.

Therefore, in light of the foregoing discussion, there exists a need to overcome the aforementioned drawbacks associated with the existing searching techniques.

SUMMARY

The present disclosure seeks to provide a system, that when operated, creates a database arrangement in a structured manner. The present disclosure also seeks to provide a method of creating a database arrangement in a structure manner. The present disclosure seeks to provide a solution to the existing problem of determination of relevance of an inaccessible document. An aim of the present disclosure is to provide a solution that overcomes at least partially the problems encountered in prior art, and provides a seamless and efficient way of creating a database arrangement that allows for retrieval of relevant documents without having to analyze content of the documents.

In one aspect, an embodiment of the present disclosure provides a system, that when operated, creates a database arrangement in a structured manner, wherein the database arrangement stores documents from at least one source, the system comprising a server arrangement and the database arrangement wherein the server arrangement:

retrieves the documents from the at least one source;

pre-processes the documents from the at least one source, wherein a given document is pre-processed based on source of the given document;

associates a document identifier with each of the documents;

extracts keywords from the documents;

stores the documents in the database arrangement corresponding to the document identifiers associated therewith; and creates an index for the database arrangement, wherein the index comprises document identifier listed corresponding to the extracted keywords.

In another aspect, an embodiment of the present disclosure provides a method of creating a database arrangement in a structured manner, wherein the database arrangement stores documents from at least one source, the system comprising a server arrangement and the database arrangement wherein the method comprises:

retrieving, the documents from the at least one source;

pre-processing the documents from the at least one source, wherein a given document is pre-processed based on source of the given document;

associating a document identifier with each of the documents;

extracting keywords from the documents;

storing the documents in the database arrangement corresponding to the document identifiers associated therewith; and creating an index for the database arrangement, wherein the index comprises document identifier listed corresponding to the extracted keywords.

Embodiments of the present disclosure substantially eliminate or at least partially address the aforementioned problems in the prior art, and enable a system and method of creating database arrangement in a structured manner that allows for determination of relevance of a document using an index.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
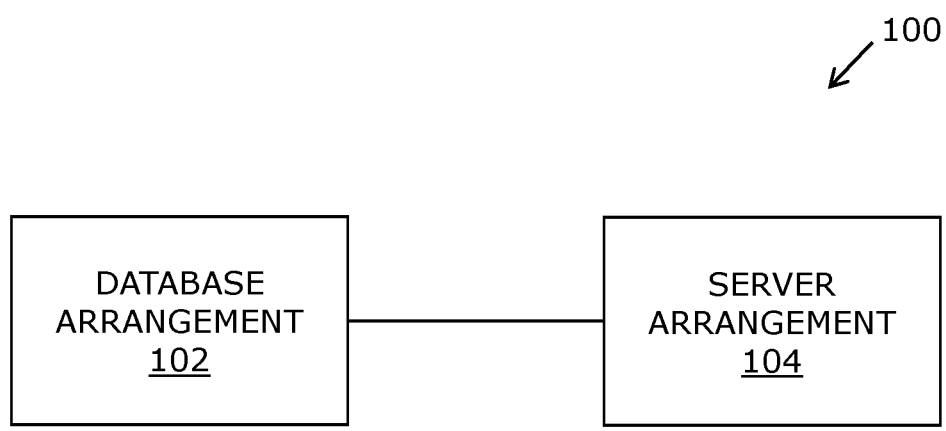
FIG. 1 illustrates a block diagram of a system, that when operated, creates a database arrangement in a structured manner, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system, that when operated, creates a database arrangement in a structured manner, wherein the database arrangement stores documents from at least one source, the system comprising a server arrangement and the database arrangement wherein the server arrangement:

retrieves the documents from the at least one source;

pre-processes the documents from the at least one source, wherein a given document is pre-processed based on source of the given document;

associates a document identifier with each of the documents;

extracts keywords from the documents;

stores the documents in the database arrangement corresponding to the document identifiers associated therewith; and creates an index for the database arrangement, wherein the index comprises document identifier listed corresponding to the extracted keywords.

In another aspect, an embodiment of the present disclosure provides a method of creating a database arrangement in a structured manner, wherein the database arrangement stores documents from at least one source, the system comprising a server arrangement and the database arrangement wherein the method comprises:

retrieving, the documents from the at least one source;

pre-processing the documents from the at least one source, wherein a given document is pre-processed based on source of the given document;

associating a document identifier with each of the documents;

extracting keywords from the documents;

storing the documents in the database arrangement corresponding to the document identifiers associated therewith; and creating an index for the database arrangement, wherein the index comprises document identifier listed corresponding to the extracted keywords.

The present disclosure provides a system and method of creating a database arrangement in a structured manner that allows for retrieval of documents stored therein based on a relevance thereof, wherein the documents are inaccessible, sensitive and confidential. Furthermore, the invention disclosed herein eliminates a need to share sensitive and confidential documents to determine a usability thereof to the user. Furthermore, the system disclosed herein provides a seamless, easy and faster approach to determine relevance of the document for a user. In addition, the system disclosed is robust and is implementable using existing hardware technologies. Moreover, the method disclosed in the present disclosure has low cost and time complexity.

The system disclosed herein, when operated, creates the database arrangement in the structured manner. Notably, the database arrangement is a set of contiguous or non-contiguous memory locations. The database arrangement is configured to store data that is to be referred by way of the index created by the system. The database arrangement optionally can be a local or remote database. Furthermore, the database arrangement optionally can be a cloud-based database. Moreover, the database arrangement is created by the system in the structured manner, wherein the structured manner refers to an organized approach of data representation such as a tabular structure, a list and the like. Beneficially, creating the database arrangement in the structured manner makes retrieval of elements therein easier and faster. Consequently, creating the database arrangement in the structured manner increases a throughput of the system.

Optionally, the database arrangement may be organized using a centralized approach or a distributed (namely, decentralized) approach. More optionally, the database arrangement may be implemented in hardware. For example, the organized body of related data may be in the form of a table, a map, a grid, a packet, a datagram, a file, a document, a list or in any other form. The database arrangement includes any data storage software and systems, such as, for example, a relational database like IBM DB2 and Oracle 9. Furthermore, the database arrangement refers to one or more software programs for creating and managing one or more databases. Optionally, the database arrangement may be operable to supports relational operations, regardless of whether it enforces strict adherence to the relational model, as understood by those of ordinary skill in the art. Additionally, the database arrangement is populated by data elements. Furthermore, the data elements may include documents, data records, bits of data, cells, are used interchangeably herein and all intended to mean information stored in cells of a database.

Furthermore, the database arrangement stores documents from at least one source. The at least one source is accessible to the system. The at least one source comprises documents to be stored in the database arrangement. Notably, documents from the at least one source are stored in the structured manner in the database arrangement. The at least one source of the documents is an online or offline source of data. In an example, the at least one source of documents is a website of company conducting clinical trials. In another example, the at least one source of documents is a data repository of an author of a journal.

Optionally, the at least one source is at least one of a: public data source, private data source. The documents provided to the system may include public data and be easily accessible. The public data may be provided to the system by the public data source. Examples of public data source includes: an article, a journal, a website and so forth. Alternatively, the documents provided to the system may include private and confidential data and may be accessed with owner's permission. The private data may be provided to the system with consent of an owner of the private data, wherein the owner of the private data provides access right to the private data. Examples of private data include: an unpublished clinical trial, business details of an organization, statistics related to an ongoing scientific experiment and the like. Moreover, private data source may be a user's data repository having confidential data or a sensitive third-party data acquired thereby.

Furthermore, the system comprises the server arrangement and the database arrangement. The server arrangement and the database arrangement are communicably coupled. The server arrangement is enabled to access the database arrangement. Furthermore, the server arrangement is a single or a group of processors. In an instance, the server arrangement is the group of processors, wherein the group of processors are configured to work in parallel or in pipeline. Furthermore, the server arrangement relates to a structure and/or module that include programmable and/or non-programmable components configured to store, process and/or share information. Optionally, the server arrangement includes any arrangement of physical computational entities capable of processing and enhancing information to perform various computational tasks. Furthermore, it should be appreciated that optionally the server arrangement may be both single hardware server and/or plurality of hardware servers operating in a parallel or distributed architecture. In an example, the server arrangement may include components such as memory, a processor, a network adapter and the like, to store, process and/or share information with other computing components, such as user device/user equipment.

Optionally, the server arrangement and the database arrangement are communicably coupled by way of a wired or wireless network. Furthermore, the communicable coupling may be established via a communication network, wherein the communication network is an arrangement of interconnected programmable and/or non-programmable components that are configured to facilitate data communication between one or more electronic devices and/or databases, whether available or known at the time of filing or as later developed. Furthermore, the communication network may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the communication network includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols.

As mentioned previously, the server arrangement retrieves the documents from the at least one source. The server arrangement is enabled to access the at least one source. The documents from the at least one source is retrieved by way of a command, an instruction, a scheduled operation, a drag and drop operation and the like. The documents from the at least one source is provided by a user of the system, a computing device. In addition, the documents from the at least one source may optionally be provided to the system automatically by the computing device or manually by the user of the system. The documents, from the at least one source, are retrieved by the server arrangement in a sequential or random order.

Furthermore, the server arrangement pre-processes the documents from the at least one source, wherein a given document is pre-processed based on source of the given document. Notably, the documents retrieved from the at least one source have different formats and organizations. The documents are pre-processed in order to uniformly format and organize the documents retrieved from the at least one source. Specifically, pre-processing of documents involves a plurality of operations depending upon a source and format of the documents. Beneficially, pre-processing of the documents is performed for providing common standard to each of the documents retrieved from the at least one source. Therefore, common standard of each of the documents makes further operations within the system easier and faster as it eliminates requirement of customizing further operations depending upon format and organization of the documents.

Optionally, pre-processing of the documents may be performed for conversion thereof to a predefined format. More optionally, the predefined format may be a JavaScript Object Notation (JSON) format. Notably, JSON namely, JavaScript Object Notation, is a minimal, readable format for structuring data. It is used primarily to transmit data between server arrangement and web application Optionally, pre-processing the documents may include parsing and analyzing of data elements stored in the documents. In addition, pre-processing the documents may also involve identifying a context of the documents.

In an embodiment, a given document may be added to an existing data source in a data repository. The existing data source may be monitored by a file watcher, wherein the file watcher may keep track of changes in the existing data source and may notify the server arrangement in an instance of addition of a new document (namely, content) to the existing data source. Subsequently, the server arrangement may retrieve the given document. Moreover, the server arrangement may pre-process and convert the given document in the predefined format.

In another embodiment, when a new data source, having at least one document, may be created in the data repository. A prescheduled operation may be triggered and subsequently the server arrangement may retrieve each of the at least one document from the new data source created in the data repository. Subsequently, the server arrangement may pre-process each of the at least one document retrieved from the new data source and perform conversion thereof in the predefined format.

Optionally, pre-processing the documents comprises obfuscation of confidential data, when the source of the documents is the private data source. Notably, obfuscation of confidential data may refer to encryption (namely, masking) of the confidential data. Furthermore, obfuscation of confidential data ensures data security. Specifically, the obfuscation of confidential data protects theft and misuse thereof. In addition, obfuscation of confidential data also protects user's privacy. Moreover, encryption techniques such as Advanced Encryption Standard (AES), Triple Data Encryption Standard (3DES), Twofish, RSA encryption technique and the like may be used for obfuscation of confidential data.

Optionally, the server arrangement, after pre-processing the documents, stores the documents in a local memory. Alternatively, optionally, the server arrangement, after pre-processing the documents, stores the documents in the data arrangement. In addition, the database arrangement may have a separate memory location or a group of memory locations for storing the documents after pre-processing.

Furthermore, the server arrangement associates the document identifier with each of the documents. The server arrangement logically associates each of the documents with the document identifier, wherein the document identifier corresponding to each of the documents uniquely identifies the document. Furthermore, the document identifier associated with each of the documents is: a numerical, alphabetical or alphanumeric string. In an example, the document identifier is associated with each of the documents by way of a pointer, a table, a list. The document identifier associated with each of the documents is used to identify a specific document.

Subsequently, the server arrangement extracts keywords from the documents. The server arrangement accesses and analyzes contents of the documents in order to identify the keywords therein, wherein keywords are words, phrases, symbols and the like that has a meaning, a context associated therewith. The server arrangement analyses the documents and identifies keywords therein. In an instance, the identified keywords are extracted by the server arrangement and stored in a temporary memory location associated with the server arrangement. The keywords extracted by the server arrangement are stored by in a structured form for example a list, a table, a chart or any other suitable way of representing the keywords.

Optionally, the keywords in the document may be identified by way of tokenization and parsing. The server arrangement may parse and tokenize contents of the document for identifying the keywords.

In an embodiment, the server arrangement extracts keywords using an ontological databank, wherein the ontological databank comprises a plurality of concepts. The indexing server may access and analyze the plurality of concepts in the ontological databank to identify synonyms, related words, phrases having similar context to the keywords. The ontological databank may be an organized body of digital information that relates to a plurality of concepts (namely, information, ideas, data, and so forth) in a field of interest (namely, subject area, domain and so forth). Furthermore, the ontological databank provides synonyms, phrases and the like related to the keywords. Moreover, the ontological databank provides a structured, optimal and relevant concepts pertaining to the field of interest. Optionally, the ontological databank includes the plurality of concepts in form of a text, an image, an audio, a video, or any combination thereof. Furthermore, the plurality of concepts in the ontological databank may have a one or more keywords therein. The content in the document that is similar to at least one of the plurality of concepts in the ontological databank may be a keyword. Additionally, optionally, ontological databank may provide information on a way a certain keyword from the plurality of concepts may be related to one or more keywords from other concepts. Optionally, the ontological databank may be implemented using hardware, software, firmware and/or any combination thereof. For example, the ontological databank includes any data storage software and/or hardware, such as, a relational database like IBM DB2 and Oracle 9.

Furthermore, the server arrangement stores the documents in the database arrangement corresponding to the document identifiers associated therewith. The documents are stored corresponding to the document identifiers associated therewith by way of a list, a table or any other way of structured data organization that represents an association between the documents and the document identifiers associated therewith. Specifically, a given document identifier corresponding to a given document signifies that the given document is uniquely identified by the given document identifier. Beneficially, storing the documents corresponding to the document identifiers associated therewith makes it simple and less time consuming to retrieve the document that is associated with the document identifier.

Moreover, the server arrangement creates the index for the database arrangement, wherein the index comprises document identifier listed corresponding to the extracted keywords. The index created by the system comprises the document identifier listed corresponding to keywords included in the document. The index is a tabular arrangement having a plurality of columns and rows, wherein one of the plurality of columns includes keywords and one or more of the plurality of columns include document identifiers. Therefore, each of the rows include a keyword and one or more document identifiers listed corresponding thereto wherein the index comprises document identifier listed corresponding to the extracted keywords. The server arrangement creates the index in form of a list, a table and the like. Furthermore, the index includes keywords related to the document and the document identifier associated with the document related to the keyword. In other words, the document identifier associated with the extracted keywords refers to the documents that comprise the keywords. The index is used to retrieve the documents stored in the database arrangement, wherein the document identifier included in the index is listed corresponding to document related thereto.

Optionally, a given keyword may have more than one document identifier associated therewith. Notably, one or more keywords that are included in a plurality of documents may have more than one document identifier associated therewith. Optionally, a given row in the index includes synonyms of the keyword.

Optionally, the server arrangement retrieves documents from the database arrangement by: receiving, as a user-input, at least one of keywords stored in the index for the database arrangement; identifying, from the index for the database arrangement, document identifiers associated with the user-input; and retrieving, from the database arrangement, documents corresponding to the document identifiers. At first step, the system may take an input provided by a user via the server arrangement. The server arrangement may have a user interface that allows for interaction between the user and the system. The user may use the user interface to provide the user-input. Alternatively, the server arrangement is associated with a user device having the user interface that allows interaction between the system and the user. At an instance the user-input may be provided by a computing device. Notably, the user-input provided to the user may be a word or a phrase, wherein the word may be a keyword from the index or the phrase may include one or more keywords from the index. Subsequently, the server arrangement analyses the keywords stored in the index for identifying a keyword that is identical to the keyword in the user-input. Moreover, the server arrangement retrieves the document identifiers corresponding to the keyword identified in the index. Furthermore, the server arrangement accesses the database arrangement and retrieves the documents stored corresponding to the document identifiers identified from the index. The documents retrieved from the database arrangement are provided to the user as an output of the user-input provided thereby.

In an example implementation, the system for creating a database arrangement in a structured manner, may be provided with documents from at least one source 'a client data repository', wherein the documents may be 'a business strategy', 'a clinical trial', 'a scientific experiment' and the like. The system comprises a server arrangement, wherein the server arrangement retrieves the documents from 'the client data repository'. The documents retrieved from the 'client data repository' are pre-processes by the server arrangement, wherein the documents are pre-processed based on source thereof. Notably, the documents have been retrieved from 'the client data repository' that is a private data source. Therefore, the documents are pre-processed accordingly. Furthermore, a document identifier is associated with each of the documents after pre-processing thereof, wherein the documents: 'the business strategy' is associated with document identifier 'BS-46790', 'the clinical trial' is associated with 'CT-89765', 'the scientific experiment' is related with 'SE-64321'. Moreover, the server arrangement extracts keywords from each of the documents: the business strategy, the clinical trial, and the scientific experiment. Keywords extracted from the document 'the business strategy' are: market, break-even value and pricing, keywords extracted from the document 'the clinical trial' are: phase, geographical location, number of patients, condition, keywords extracted from the document 'the scientific experiment' are: composition, chemicals, precipitate. Furthermore, the documents are stored in the database arrangement, wherein the documents are stored corresponding to the document identifier associated therewith. The document 'the business strategy' is stored corresponding to the document identifier BS-46790. The document the clinical trial is stored corresponding to the document identifier CT-89765. The document 'the scientific experiment' is stored corresponding to the document identifier SE-64321. Furthermore, the server arrangement creates an index for the database arrangement wherein the keywords from each of the documents are listed corresponding to the document identifier of the documents related thereto. The keywords market, break-even value and pricing are listed corresponding to the document identifier BS-46790. The keywords phase, geographical location, number of patients, condition are listed corresponding to the document identifier CT-89765. The keywords composition, chemicals, precipitate are listed corresponding to the document identifier SE-64321. Moreover, a user may provide a user-input break-even to the server arrangement. The server arrangement may identify the document identifier BS-46790 that is associated with the keyword break-even using the index. Subsequently, the server arrangement retrieves the document the business strategy stored in the database arrangement associated with the document identifier BS-46790.

The present disclosure also relates to the method as described above. Various embodiments and variants disclosed above apply mutatis mutandis to the method.

Optionally, in the method, the at least one source is at least one of a: public data source, private data source.

Optionally, in the method, pre-processing the documents comprises obfuscation of confidential data, when the source of the documents is a private data source.

Optionally, in the method, the server arrangement extracts keywords using an ontological databank, wherein the ontological databank comprises a plurality of concepts.

Optionally, in the method, the server arrangement retrieves documents from the database arrangement by:
  receiving, as a user-input, at least one of keywords stored in the index for the database arrangement;
  identifying, from the index for the database arrangement, document identifiers associated with the user-input; and
  retrieving, from the database arrangement, documents corresponding to the document identifiers.

DETAILED DESCRIPTION OF THE DRAWINGS

Referring to FIG. 1, illustrated is a block diagram of a system 100, that when operated, creates a database arrangement 102 in a structured manner, in accordance with an embodiment of the present disclosure. The system 100 comprises a server arrangement 104 and the database arrangement 102.

Figure 2:
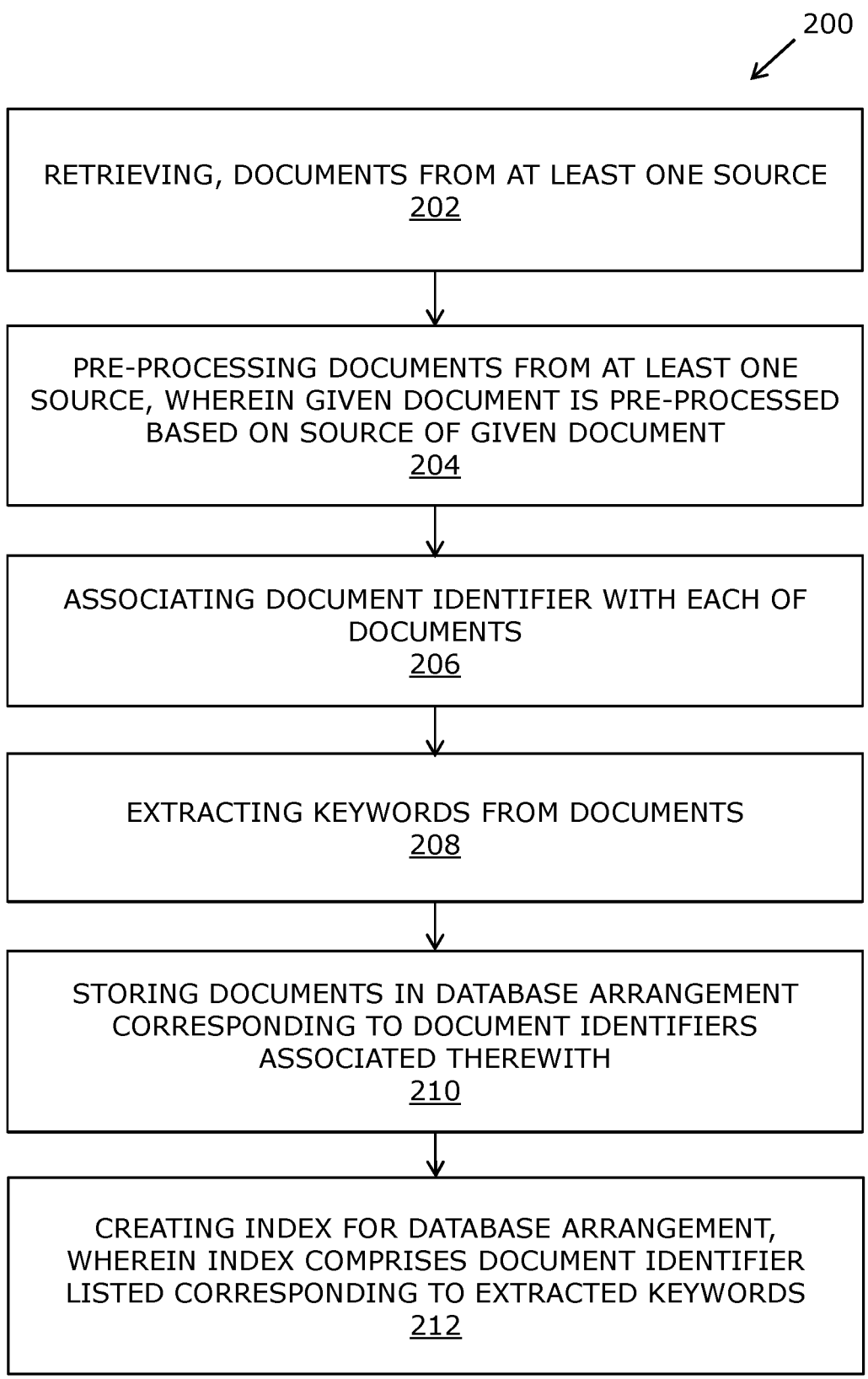
FIG. 2 illustrates steps of a method of creating a database arrangement in a structured manner, in accordance with an embodiment of the present disclosure.

Referring to FIG. 2, illustrated are steps of a method 200 of creating a database arrangement in a structured manner, in accordance with an embodiment of the present disclosure. The database arrangement stores documents from at least one source. At step 202, the documents are retrieved from the at least one source. At step 204, the documents from at least one source are pre-processed. Notably, a given document is pre-processed based on source of the given document. At step 206, a document identifier is associated with each of the documents. At step 208, keywords from the documents are extracted. At step 210, the documents in the database arrangement are stored corresponding to the document identifiers associated therewith. At step 212, an index for the database arrangement is created. Notably, the index comprises document identifier listed corresponding to the extracted keywords.

Figure 3:
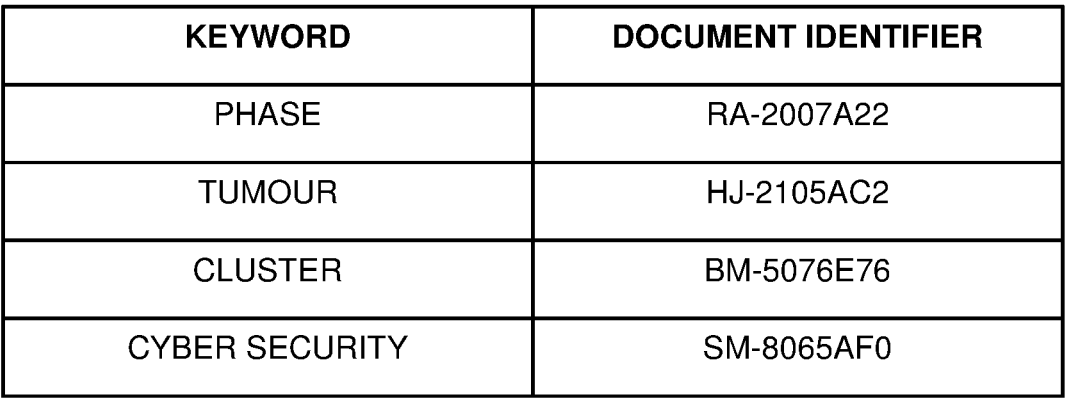
FIG. 3 illustrates an exemplary index created by the system of FIG. 1, in accordance with an embodiment of the present disclosure.

Referring to FIG. 3, illustrated is an exemplary index 300 created by a system 100 of FIG. 1, in accordance with an embodiment of the present disclosure. The index 300, in a first column, includes keywords and, in a second column, includes document identifiers. The index 300 includes a plurality of keywords "PHASE", "TUMOUR", "CLUSTER" and "CYBER SECURITY" and document identifiers "RA-2007A22", "HJ-2105AC2", "BM-5076E76" and "SM-8065AF0" respectively listed corresponding to the keywords. A given keyword in the index 300 is associated with a document having a document identifier corresponding thereto. For example, keyword "PHASE" may be associated with a document having document identifier It is to be understood that the index 300 is mere an example and other formats for the index may be used. It will be appreciated that the index may include entries from different documents having different document identifiers that are not mentioned herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for creating an index for database arrangement that allows for retrieval of documents based on a relevance thereof, the system comprising a server arrangement and the database arrangement, wherein the server arrangement:
    retrieves the documents from at least one source, wherein the at least one source is a private data source;
    pre-processes the documents retrieved from the at least one source, wherein a given document is pre-processed based on source of the given document, wherein the documents are pre-processed for
        parsing and analyzing of data elements stored in the documents for identifying a context of the documents,
        two-way obfuscation of confidential data using a reversible Advanced Encryption Standard (AES) encryption technique and conversion thereof to a JavaScript Object Notation (JSON) format;
    associates a document identifier with each of the documents;
    extracts keywords from the documents using an ontological databank; and
    creates an index for the database arrangement, wherein the index comprises document identifier listed corresponding to the extracted keywords.

2. The system of claim 1, wherein the server arrangement extracts keywords using an ontological databank, wherein the ontological databank comprises a plurality of concepts.

3. The system of claim 1, wherein the server arrangement retrieves documents from the database arrangement by:
    receiving, as a user-input, at least one of keywords stored in the index for the database arrangement;
    identifying, from the index for the database arrangement, document identifiers associated with the user-input; and
    retrieving, from the database arrangement, documents corresponding to the document identifiers.

4. A method of creating an index for database arrangement that allows for retrieval of documents based on a relevance thereof, the system comprising a server arrangement and the database arrangement wherein the method comprises:
    retrieving, the documents from at least one source, wherein the at least one source is a private data source;
    pre-processing the documents retrieved from the at least one source, wherein a given document is pre-processed based on source of the given document, wherein the documents are pre-processed for
        parsing and analyzing of data elements stored in the documents for identifying a context of the documents,
        two-way obfuscation of confidential data using reversible Advanced Encryption Standard (AES) encryption technique and conversion thereof to a JavaScript Object Notation (JSON) format;
    associating a document identifier with each of the documents;
    extracting keywords from the documents using an ontological databank; and
    creating an index for the database arrangement, wherein the index comprises document identifier listed corresponding to the extracted keywords.

5. The method of claim 4, wherein the server arrangement extracts keywords using an ontological databank, wherein the ontological databank comprises a plurality of concepts.

6. The method of claim 4, wherein the server arrangement retrieves documents from the database arrangement by:
    receiving, as a user-input, at least one of keywords stored in the index for the database arrangement;
    identifying, from the index for the database arrangement, document identifiers associated with the user-input; and
    retrieving, from the database arrangement, documents corresponding to the document identifiers.

* * * * *